US009424745B1

(12) United States Patent
Kagoshima et al.

(10) Patent No.: US 9,424,745 B1
(45) Date of Patent: Aug. 23, 2016

(54) PREDICTING TRAFFIC PATTERNS

(71) Applicants: Alexander Masaru Kagoshima, Berlin (DE); Noelle Lindsay Sio, London (GB); Kaushik Kunal Das, Woodside, CA (US)

(72) Inventors: Alexander Masaru Kagoshima, Berlin (DE); Noelle Lindsay Sio, London (GB); Kaushik Kunal Das, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 250 days.

(21) Appl. No.: 14/077,063

(22) Filed: Nov. 11, 2013

(51) Int. Cl.
*G01C 21/28* (2006.01)
*G08G 1/01* (2006.01)

(52) U.S. Cl.
CPC .................................... *G08G 1/0125* (2013.01)

(58) Field of Classification Search
None
See application file for complete search history.

(56) References Cited

U.S. PATENT DOCUMENTS 7,706,964 B2 * 4/2010 Horvitz .............. G01C 21/3492 342/357.31
8,238,610 B2 8/2012 Shah et al.
8,284,996 B2 10/2012 Winkler
8,483,940 B2 7/2013 Chapman et al.
8,599,255 B2 12/2013 Lin
2007/0208493 A1 * 9/2007 Downs ................. G08G 1/0104 701/117
2007/0208495 A1 * 9/2007 Chapman ............. G08G 1/0104 701/117
2007/0208496 A1 * 9/2007 Downs ................. G08G 1/0104 701/117
2007/0208497 A1 * 9/2007 Downs ................. G08G 1/0104 701/117
2008/0046165 A1 * 2/2008 Downs ................. G08G 1/0104 701/117
2008/0071465 A1 * 3/2008 Chapman ........... G01C 21/3691 701/117
2012/0197839 A1 * 8/2012 Vervaet .................. G09B 29/10 707/609
2013/0179382 A1 7/2013 Fritsch et al.
2013/0286198 A1 * 10/2013 Fan .......................... G08G 1/04 348/143
2014/0114885 A1 * 4/2014 Han ..................... G06N 3/0454 706/12
2014/0160295 A1 * 6/2014 Kyomitsu ............ G08G 1/0112 348/159
2014/0195138 A1 * 7/2014 Stelzig ................. G08G 1/0116 701/119
2015/0120175 A1 * 4/2015 Vahidi .................. G08G 1/0141 701/119

FOREIGN PATENT DOCUMENTS

WO 2014/036277 3/2014

OTHER PUBLICATIONS

Modeling Highway Traffic Volumes, Tomas Singliar and Milos Hauskrecht, Proceedings of Eighteen European Conference on Machine Learning (ECML), 2007.*

* cited by examiner

*Primary Examiner* — Rami Khatib
*Assistant Examiner* — Navid Ziaeianmehdizadeh

(57) ABSTRACT

Methods, systems, and apparatus, including computer programs encoded on computer storage media, for predicting traffic patterns. One of the methods includes receiving a velocity distribution for a road segment, wherein the velocity distribution includes, for each velocity interval, a count of how many velocity observations have a velocity measurement within the velocity interval, wherein each velocity observation has one or more features describing conditions under which the velocity observation was made. A mixture model having K component distributions is generated for the velocity distribution. A decision tree is generated from the K component distributions and a rule is generated from a particular leaf of the decision tree, wherein the rule maps one or more features for the road segment to one of the K component distributions according to a path from the root of the decision tree to the particular leaf.

21 Claims, 7 Drawing Sheets

PREDICTING TRAFFIC PATTERNS

BACKGROUND

This specification relates to predictive modeling.

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively.

SUMMARY

This specification describes how a system can generate a model to predict traffic patterns on a particular road segment. The model can be used to determine a probabilistic velocity distribution for traffic on the road segment having a particular set of features, e.g., traffic traveling during a particular time period or traffic turning from the road segment onto another road segment.

In general, one innovative aspect of the subject matter described in this specification can be embodied in methods that include the actions of receiving a velocity distribution for a road segment, wherein the velocity distribution includes a plurality of velocity intervals, and, for each velocity interval, a count of how many velocity observations have a velocity measurement within the velocity interval, wherein each velocity observation has one or more features describing conditions under which the velocity observation was made; generating a mixture model having K component distributions, including generating a respective component distribution for each of one or more segments of the velocity distribution, wherein each velocity observation in the velocity distribution is assigned to one of the K component distributions; generating a decision tree, wherein the decision tree has a plurality of leaves, each leaf corresponding to one of the K component distributions, wherein a path from a root of the decision tree to each leaf represents a particular set of one or more features for the road segment; and generating a rule from a particular leaf of the decision tree, wherein the rule maps one or more features for the road segment to one of the K component distributions according to a path from the root of the decision tree to the particular leaf, wherein the path corresponds to the one or more features for the road segment. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include receiving a first velocity observation having one or more first features; obtaining a rule generated from a particular leaf node of the decision tree, wherein the rule maps the one or more first features of the first velocity observation to a first component distribution; and designating the first velocity observation as belonging to the first component distribution. The actions include determining that a first component of the K component distributions is assigned multiple, non-consecutive segments of the velocity distribution; and assigning a first segment of the multiple, non-consecutive segments to a second component distribution of the K component distributions. Assigning a first segment of the multiple, non-consecutive segments to a second component distribution of the k component distributions comprises determining that a particular segment assigned to the first component is an out of order segment in an ordering of the K component distributions by mean; and reassigning the out of order segment. Reassigning the out of order segment comprises reassigning the out of order segment to a component distribution of an adjacent segment. Reassigning the out of order segment comprises reassigning the out of order segment to a particular component distribution of the adjacent component distributions having a lower mean. The actions include computing a difference between a first mean or median of a first component distribution of the K component distributions and a second mean or median of a second component distribution of the K component distributions; determining that the difference satisfies a threshold; and in response to determining that the difference satisfies a threshold, assigning a first segment assigned to the first component distribution and a second segment assigned to the second component distribution to a third component distribution. A feature of the one or more features is a vehicle type, a road segment type, information about existing weather conditions, a number of traffic lights on the road segment, a ratio of green light time to red light time on the road segment, or a direction of travel. Generating a mixture model having K component distributions further comprises calculating a Bayesian information criterion for a plurality of mixture models, wherein each mixture model has a different number of component distributions; and determining that the mixture model from the plurality of mixture models has a least negative Bayesian information criterion. Calculating the Bayesian information criterion comprises applying a penalty factor that penalizes models having a higher number of component distributions.

Particular embodiments of the subject matter described in this specification can be implemented so as to realize one or more of the following advantages. A system can use velocity data on a road segment to automatically generate classification rules that determine traffic behavior for traffic having a particular set of features, e.g., traffic flow on a road segment at various times of day and days of the week. The classification rules can be used to determine causes of traffic congestion or other traffic conditions. The rules can also be used to predict a vehicle's expected speed on the road segment depending on features of the road segment, for example, a time of day or a direction of travel.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
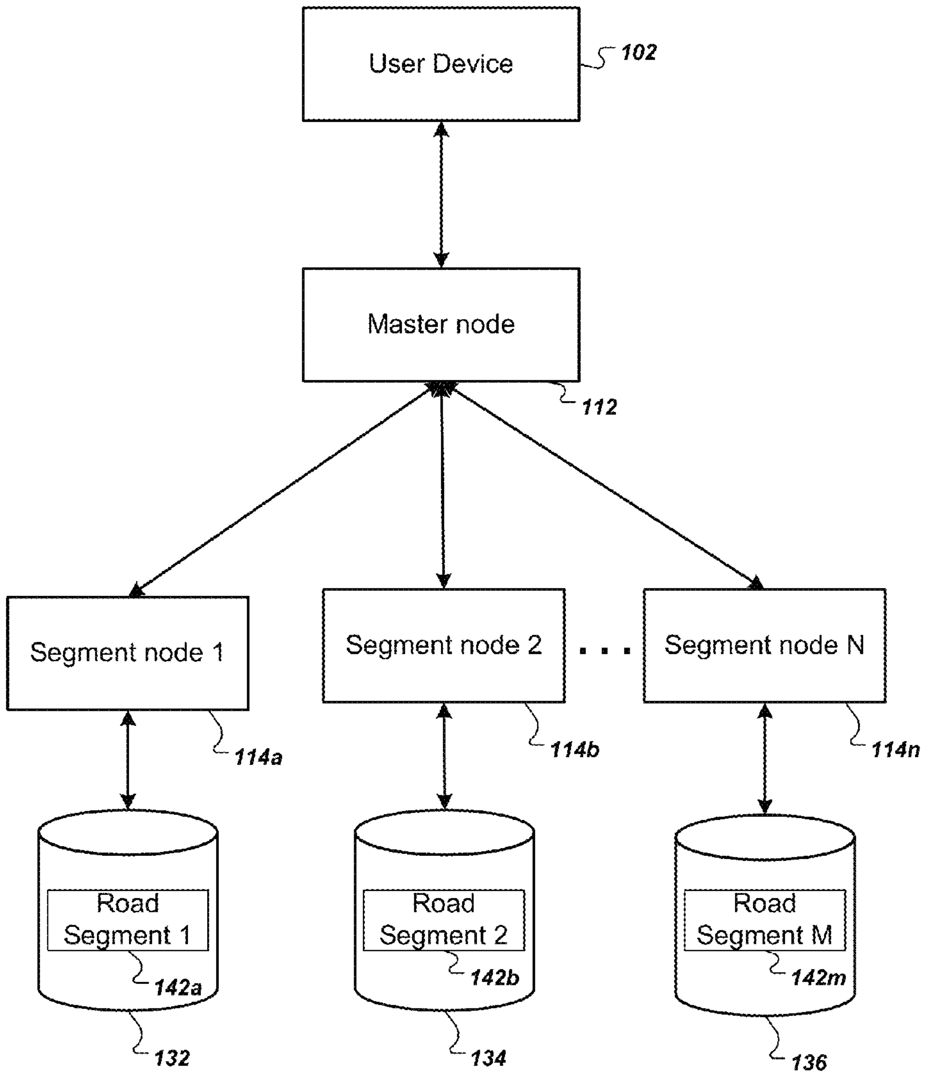
FIG. 1A is a diagram of an example distributed system.

FIG. 1A is a diagram of an example distributed system 100. The distributed system 100 is an example of a computing system that can be used to generate models to predict traffic behavior on road segments.

The distributed system 100 includes a master node 112 and multiple segment nodes 114*a*, 114*b*, through 114*n*. The master node 112 and each segment node 114*a-n* are implemented as one or more physical computers or as software installed as a virtual machine on a physical computer. The master node 112 and the segment nodes 114*a-n* are connected by one or more communications networks, e.g., a local area network or the Internet. The master node 112 assigns each segment node to operate on a portion of data stored in the distributed system 110.

Each data portion generally stores velocity observations for a particular road segment. Each velocity observation includes an identifier of a particular road segment, e.g., a street or a highway segment, and a velocity measurement. Generally, the velocity measurement represents the velocity of a vehicle traveling on the road segment, although the velocity measurements can also represent velocities of other things, e.g., people walking or people on bicycles. Each velocity observation also has a number of features describing conditions under which the velocity observation was made, for example, a time of day, a vehicle type, a road segment type, e.g., street or highway, information about existing weather conditions, e.g., rainy or sunny, information about traffic lights on the road segment, e.g., a number of traffic lights or a ratio of green light time to red light time, and a direction of travel.to name just a few examples.

The system 100 can include thousands or millions of velocity observations for each of thousands or millions of road segments. Thus, the master node 112 can divide the processing among N segment nodes, e.g., the segment nodes 114*a-n*. The segment nodes can access the velocity observations by communicating with data nodes in an underlying distributed storage system, for example, the Hadoop File System (HDFS). The data is generally partitioned among multiple storage devices and can be organized according to any appropriate key-value storage subsystem. For example, the data portions can be table partitions of a relational database distributed among multiple storage devices, e.g., as part of a massively parallel processing (MPP) database. The data portions can also be stored as part of a distributed, non-relational database, e.g., in a Hadoop Database (HBase) that organizes data by key-value pairs in distinct column families and distributed across multiple storage devices.

For example, the master node 112 has assigned the segment node 114*a* to operate on velocity data 142*a* for a first road segment, stored in a first storage subsystem 132. Similarly, the master node 112 has assigned the segment node 142*b* to operate on velocity data 142*b* for a second road segment, stored in a second storage subsystem 134, and the master node 112 has assigned the segment node 142*m* to operate on velocity data 142*m* for an Mth road segment, stored in a third storage subsystem 136.

Figure 1B:
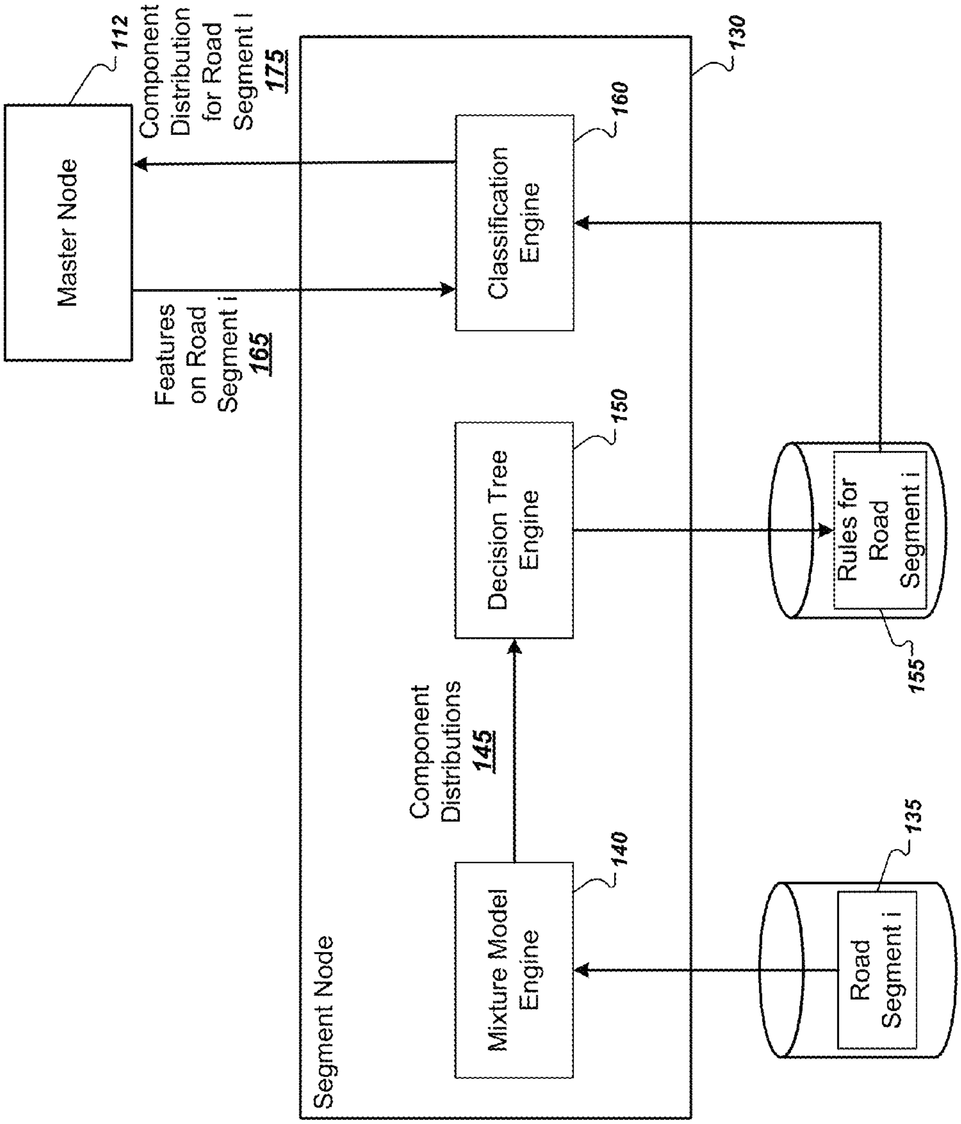
FIG. 1B is a diagram of an example segment node.

FIG. 1B is a diagram of an example segment node 130. The segment node includes a mixture model engine 140, a decision tree engine 150, and a classification engine 160.

The mixture model engine 140 receives velocity data 135 for a particular road segment and generates a mixture model. The mixture model includes a plurality of component distributions, where each component distribution is assigned a non-overlapping segment of the velocity distribution. The mixture model engine provides the generated component distributions 145 to a decision tree engine 150.

The decision tree engine 150 uses the features of velocity observations assigned to each component distribution to generate a decision tree model. The decision tree model assigns a set of non-velocity features to a particular component distribution. The decision tree engine 150 can use the decision tree to generate a set of rules 155 for the road segment. Each rule in the set of rules 155 maps a particular set of features to a component distribution generated by the mixture model engine 140.

After generating the set of rules 155 for the road segment, the segment node can receive, at a classification engine 160 and from the master node 112, a set of features 150 for the road segment. The set of features 165 may belong to a new velocity observation on the road segment or may represent driving conditions on the road segment during a particular time of day or day of the week. The classification engine 160 can obtain the set of rules 155 for the road segment and return, to the master node 112, a component distribution 175 for the road segment using a rule that matches the set of features 165.

Figure 2:
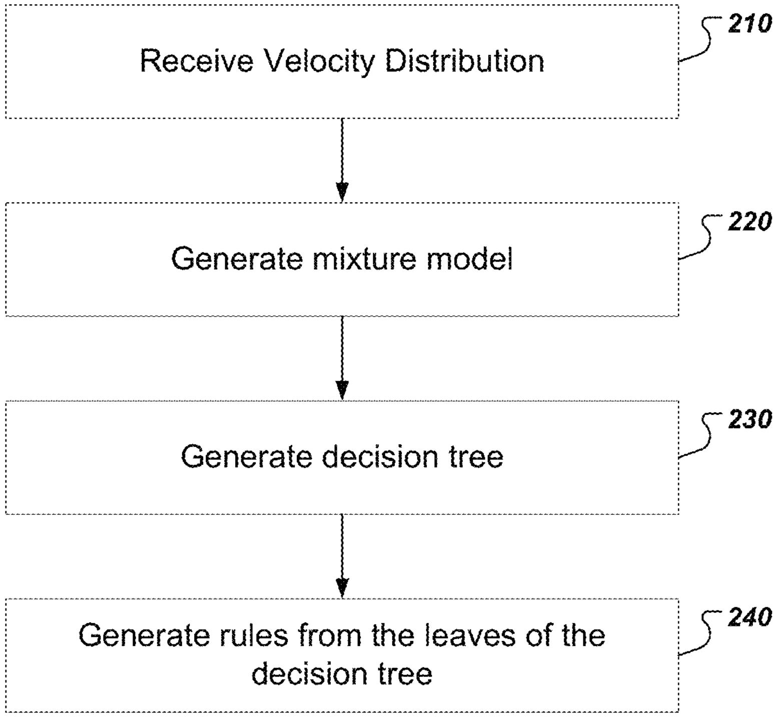
FIG. 2 is a flow chart of an example process for generating classification rules for a road segment.

FIG. 2 is a flow chart of an example process for generating classification rules for a road segment. In general, the system receives a velocity distribution for a particular road segment. The distribution includes velocity observations on the road segment, with each velocity observation having one or more features. The system can then generate a mixture model having K component distributions. The system can then use the component distributions of the mixture model to generate a decision tree model that assigns a set of features to a component distribution. The system can then generate rules that map a set of features to a particular component distribution for predicting traffic behavior on a road segment. The process can be performed by a particular segment host of a distributed system. The process will be described as being performed by a system of one or more appropriately programmed computers.

The system receives a velocity distribution of a road segment (210). The velocity distribution includes a number of velocity intervals, and, for each interval, a measure, e.g., a frequency value or a count, of velocity observations on the road segment having a velocity measurement within the interval. In some implementations, the system generates the velocity distribution from raw velocity observations on the road segment. In some other implementations, the system generates the distribution from a density estimation of an underlying probability density function, where the value associated with each interval represents a probability that a velocity observation falls within the interval.

The system generates a mixture model (220). In general, the system will segment the velocity distribution into multiple segments and generate, for each segment, a respective component distribution. The component distributions will have a respective associated mean, standard deviation, and weight, which can be additively combined to approximate the original velocity distribution. The system can use any appropriate algorithm to generate the component distributions, e.g., an expectation maximization algorithm. In some implementations, the system generates a Gaussian mixture model, in which the component distributions that are Gaussian distributions. The system can also generate component distributions of any appropriate distribution type, e.g., a Poisson distribution or a Chi-Squared distribution.

An example segmentation of a velocity distribution is shown in TABLE 1, along with an identifier of the resulting component distribution to which the segment is assigned:

TABLE 1

| VELOCITY RANGE | COMPONENT DISTRIBUTION |
|---|---|
| 0-75 km/hr | 1 |
| 76-90 km/hr | 2 |
| 90+ km/hr | 3 |

The system can assign component distribution identifiers in order by the value of a mean or median velocity of the component distribution. For example, component distribution 3 in TABLE 1 would have a higher mean velocity than component distribution 2 because it is generated using a higher range of velocity observations. Similarly, component distribution 2 has a higher mean or median velocity than component distribution 1.

Figure 3:
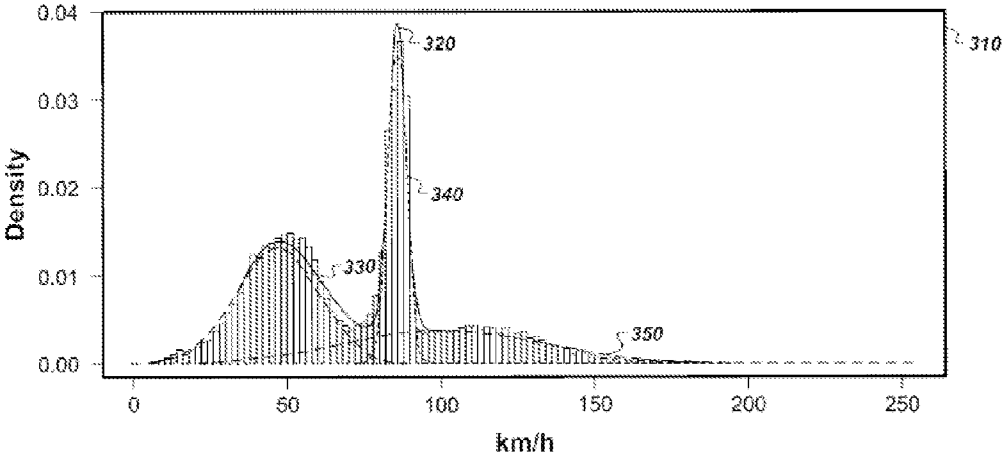
FIG. 3 illustrates component distributions of an example Gaussian Mixture Model.

FIG. 3 illustrates component distributions of an example Gaussian Mixture Model. The velocity distribution 310 has three component distributions. A first component distribution 330 corresponds to a first velocity distribution segment from 0-75 km/hr. A second component distribution 340 corresponds to a second velocity distribution segment from 76-90 km/hr, and a third component distribution 350 corresponds to a third velocity distribution segment of 90+ km/hr. The three component distributions can be additively combined to generate a distribution function 320 that approximates the original velocity distribution 310.

Figure 4:
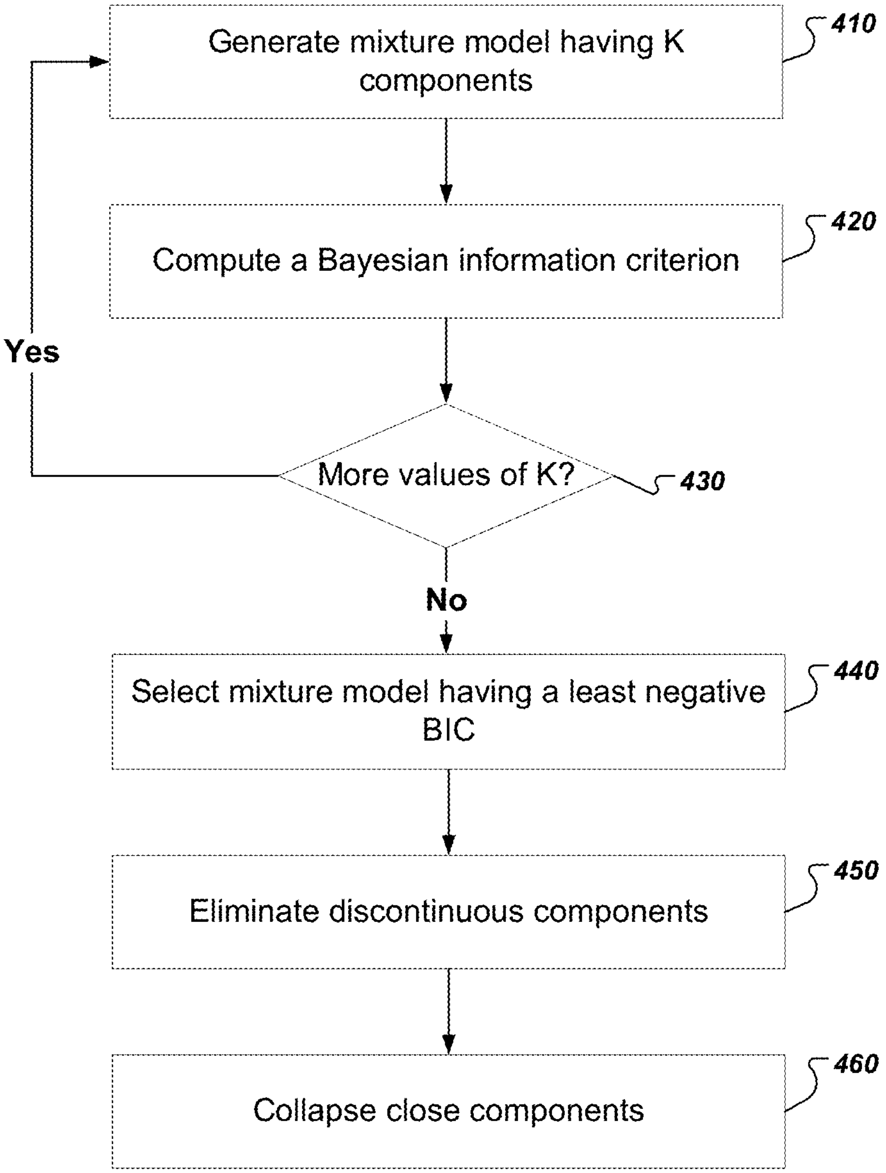
FIG. 4 is a flow chart of an example process for generating a mixture model.

FIG. 4 is a flow chart of an example process for generating a mixture model. In general, the system can improve a generated mixture model by performing various refinements, including eliminating discontinuous components, collapsing components that are close together, and by choosing a number of distributions having a closest fit to the original data.

The system generates a mixture model having K components (410). In general, the system generates a candidate mixture model having a value of K between 1 and N components. The system can then choose a value for K that best fits the original velocity distribution.

The system computes a Bayesian information criterion for the mixture model (420). The Bayesian information criterion (BIC) is a measure of how well the component distributions of the mixture model fit the original data. For a particular mixture model, the BIC can be computed according to:

$$BIC = -2\times\ln(\rho(X|\lambda)) + f\times c\times\ln(\eta),$$

where $\rho(X|\lambda)$ represents the marginal likelihood of the velocity distribution X given the selected model $\lambda$ with K components, $\ln(\eta)$ represents the logarithm of the number of observations.

The number of free parameters in the model, f, is given by:

$$f = 3\times K - 1.$$

The term c is an additional penalty factor that further penalizes models having a larger number of components. In other words, the term c causes the system to prefer models having fewer component distributions. In some implementations, the system sets c to a value greater than one.

The system can alternatively use any other appropriate measure of how well the component distributions fit the original data, e.g., the Akaike information criterion.

The system determines whether additional values of K remain (430). If so, the system increments K and generates another mixture model using the updated value of K (branch to 410). If not, the system chooses the number of components K that results in a least negative BIC (branch to 440).

The system eliminates discontinuous components (450). A discontinuous component is a component that has been assigned multiple, non-consecutive segments of the velocity distribution.

TABLE 2 illustrates a discontinuous component distribution.

TABLE 2

| VELOCITY RANGE | COMPONENT DISTRIBUTION |
|---|---|
| 0-5 km/hr | 2 |
| 6-49 km/hr | 1 |
| 50-69 km/hr | 2 |
| 70+ km/hr | 3 |

In TABLE 2, the system has assigned both the 0-5 km/hr segment as well as the 50-70 km/hr segment to component distribution 2, while an intervening velocity segment, 6-49 km/hr, has been assigned to a different component distribution, component distribution 1. Thus, component 2 is a discontinuous component.

To eliminate the discontinuous component, the system can reassign one of the segments that is out of order to maintain the ordering of component distributions by mean. Thus, the system can reassign the 0-5 km/hr segment to component 1, as shown in TABLE 3.

TABLE 3

| VELOCITY RANGE | OLD COMPONENT DISTRIBUTION | NEW COMPONENT DISTRIBUTION |
|---|---|---|
| 0-5 km/hr | 2 | 1 |
| 6-49 km/hr | 1 | 1 |
| 50-69 km/hr | 2 | 2 |
| 70+ km/hr | 3 | 3 |

The ordering of segments of the velocity distribution to component distributions can be represented as a list. For example, the original assignment of segments in TABLE 2 can be represented as {2,1,2,3}, and the adjusted assignment of segments in TABLE 3 can be represented as {1,1,2,3}.

In general, the system will reassign out-of-order segments to preserve the ordering of component distributions by mean. In some implementations, the system prefers reassigning segments occurring at the beginning or end of the velocity distribution. For example, an original assignment of segments to distributions can be {1,2,1}. In this case, the system could equivalently reassign the segments as {1,1,2} or {1,2,2} to maintain the order. The system can decide which reassignment to choose by preferring to reassign beginning or end segments. Thus, the system can reassign the end segment rather than the middle segment, resulting in the {1,2,2} assignment. As further examples, the first segment in each of the following segment assignments would each get reassigned to a first component: {2,1,2}, {3,1,2,3}, {2,1,2,3}, and {4,1,2,3,4}. The end segment in each of the following segment assignments would each get reassigned to component K: {1,2,1}, {1,2,3,1}, and {1,2,3,2}.

When the discontinuous component is assigned an out-of-order segment occurring in the middle of the distribution, the system can choose to reassign the out-of-order segment to a component distribution of an adjacent segment having a lower range of velocities. For example, if the segment assignment is {1,2,4,3,4}, the component distribution 4 is discontinuous and has an out-of-order segment assigned in the middle of the distribution. To reassign the out-of-order segment, the system could equivalently reassign the segments as {1,2,2,3,4} or {1,2,3,3,4}. The system can prefer to reassign the out-of-order segment to a component distribution of an adjacent segment having a lower range of velocities, thus resulting the assignment {1,2,2,3,4}.

Some velocity segment assignments can result in multiple discontinuous segments, e.g., {2,1,2,3,2}. In this case, the system can reassign multiple out-of-order segments, e.g., both the beginning and end segments, resulting in the distribution {1,1,2,3,3}.

In addition, some velocity segment assignments can result in both kinds of discontinuity at once, e.g., {2,1,2,4,3,4}. In this case, the system can reassign the beginning segment {2} to a component distribution of an adjacent segment. The system can also reassign the middle segment {4} to a component distribution of an adjacent segment having a lower range of velocities, resulting in the assignment {1,1,2,2,3,4}.

In some implementations, the system maintains an assignment between individual velocity observations and component distributions. Thus, by reassigning the 0-5 km/hr segment to component distribution 1, the system effectively merges the 0-5 km/hr segment with the 6-49 km/hr segment, as shown in TABLE 4.

TABLE 4

| VELOCITY RANGE | COMPONENT DISTRIBUTION |
|---|---|
| 0-49 km/hr | 1 |
| 50-69 km/hr | 2 |
| 70+ km/hr | 3 |

TABLE 5 illustrates a discontinuous component distribution occurring at the end of the velocity distribution.

TABLE 5

| VELOCITY RANGE | COMPONENT DISTRIBUTION |
|---|---|
| 0-25 km/hr | 1 |
| 26-49 km/hr | 2 |
| 50-74 km/hr | 3 |
| 75+ km/hr | 2 |

In TABLE 5, component distribution 2 has a mean between 26-49 km/hr, and component distribution 3 has a mean between 50-75 km/hr. Component distribution 2 has been assigned the 26-49 km/hr segment as well as to the 75+ km/hr segment, while an intervening velocity segment, 50-75 km/hr, has been assigned to component distribution 3. The system can thus reassign observations in the 75+ km/hr segment to component 3, as shown in TABLE 6.

TABLE 6

| VELOCITY RANGE | COMPONENT DISTRIBUTION |
|---|---|
| 0-25 km/hr | 1 |
| 26-49 km/hr | 2 |
| 50+ km/hr | 3 |

TABLE 7 illustrates a discontinuous component having an assigned segment in the middle of the velocity distribution.

TABLE 7

| VELOCITY RANGE | COMPONENT DISTRIBUTION |
|---|---|
| 0-40 km/hr | 1 |
| 41-60 km/hr | 2 |
| 61-70 km/hr | 4 |
| 71-90 km/hr | 3 |
| 91+ km/hr | 4 |

In TABLE 7, component distribution 4 is discontinuous. The system thus reassigns the 61-70 km/hr segment to the adjacent component having a lower mean velocity resulting in the assignment shown in TABLE 8.

TABLE 8

| VELOCITY RANGE | OLD COMPONENT DISTRIBUTION | NEW COMPONENT DISTRIBUTION |
|---|---|---|
| 0-40 km/hr | 1 | 1 |
| 41-60 km/hr | 2 | 2 |
| 61-70 km/hr | 4 | 2 |
| 71-90 km/hr | 3 | 3 |
| 91+ km/hr | 4 | 4 |

The system collapses close components (460). The system can consider components to be close if the difference between their respective means satisfies a threshold, e.g., 5, 10, or 15 km/hr. For example, if the threshold is 10 km/hr and component 2 has a mean of 40 km/hr while component 3 has a mean of 45 km/hr, the system can collapse the two components into a single component by assigning both segments of the velocity distribution to a same component, or equivalently by assigning the observations in both segments to a same component.

Referring back to FIG. 2, the system generates a decision tree (230). The decision tree is a model that is generated using non-velocity features of velocity observations assigned to each component distribution. The system groups together all velocity observations for a particular velocity segment of a component distribution. The system can then generate a decision tree to predict to which component distribution group a new observation belongs.

The system can grow the tree by recursively determining a non-velocity feature that is the best predictor for distinguishing component distribution groups. The system can grow the tree until a stopping criterion is reached. The stopping criterion can include a minimum benefit on adding a new node. In some implementations, the system uses information gain at each tree split to determine the value of adding a particular feature to the decision tree, e.g., by splitting a node of the tree using that feature. The system starts at a root node, and tests a number of features by splitting the root node into a left and right leaf node for each feature. The left and right nodes represent different possible branches of the feature. For example, the feature “time of day” could have a left node representing times before 2 pm and a right node representing times after 2 pm. The system then computes the information gain resulting from using the feature to branch at the node and chooses a feature that produces the highest information gain, or equivalently, the smallest loss in entropy.

The system can also use additional stopping criteria when growing the decision tree. For example, the system can require a minimum number of observations per leaf node. If a particular leaf node has fewer than the minimum number of observations, the system will not further expand the leaf node into additional branches. The system can also use a maximum number of levels in the tree as a stopping criterion. If the tree reaches the maximum number of levels, the system can stop growing the tree. The system can also use Gini impurity as a stopping criterion, which is a measure of the probability that an observation in a node would be misclassified if randomly classified according to the distribution of features in the node. If the system determines that the Gini impurity satisfies a threshold for a particular node, the system can stop branching the node.

Alternatively, the system recursively grow the tree until each leaf node is associated with a single observation. The system can then prune the tree by removing nodes whose contribution satisfies a threshold, for example, as measured by information gain or Gini impurity.

A path in the tree from the root node to another node thus represents a particular set of features. Each node of the decision tree is associated with one of the component distributions and a probability that an observation having the associated set of features belongs to that component distribution.

Figure 5:
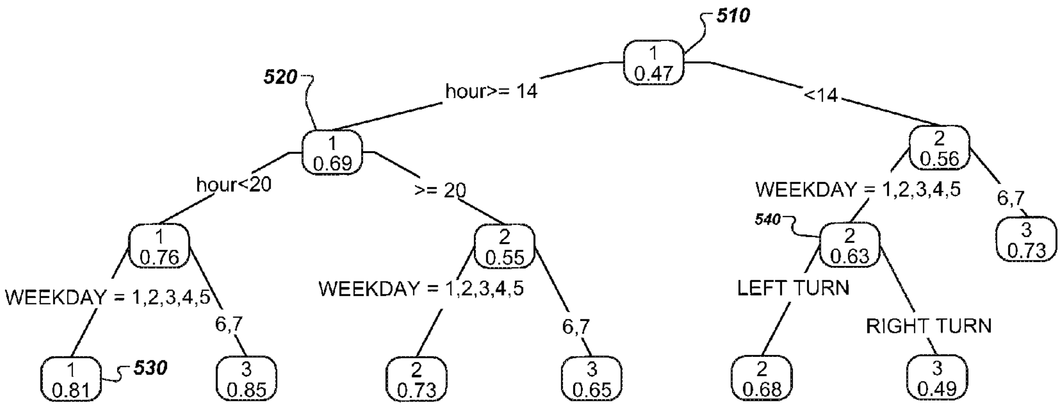
FIG. 5 illustrates an example of a decision tree.

FIG. 5 illustrates an example decision tree. Each branch in the tree represents a split between features. For example, the root node 510 represents a split between observations that occurred between midnight and 2 pm and observations that occurred between 2 pm and midnight. The node 520 represents a split between observations that occurred after 8 pm and observations that occurred before 8 pm. Similarly, the node 540 represents a split between vehicles that are making a left turn from the road segment or a right turn from the road segment.

Each node is also associated with a particular component distribution and a probability. The probability represents the likelihood that a velocity observation having a particular set of features corresponding to a path in the tree from the root node belongs to the particular component distribution. For example, node 530 represents an observation having the following features: occur on a weekday before 8 pm and after 2 pm. For that set of features, the node 530 has an associated probability of 0.81 that the observation belongs to the associated component distribution, component distribution 1.

Referring back to FIG. 2, the system generates rules from leaves of the decision tree (240). The system can generate a rule for each path in the tree from the root node to another node. In general, the rule will assign an observation to a component distribution when the observation has features matching the path. For example, referring back to FIG. 5, the system can generate the following rules shown in TABLE 10.

TABLE 10

| VELOCITY RANGE | COMPONENT DISTRIBUTION |
|---|---|
| Weekdays between 2 pm and 8 pm | 1 |
| Weekdays after 8 pm or Weekdays before 2 pm and turning left | 2 |

TABLE 10-continued

| VELOCITY RANGE | COMPONENT DISTRIBUTION |
|---|---|
| Weekends or Weekdays before 2 pm and turning right | 3 |

Figure 6:
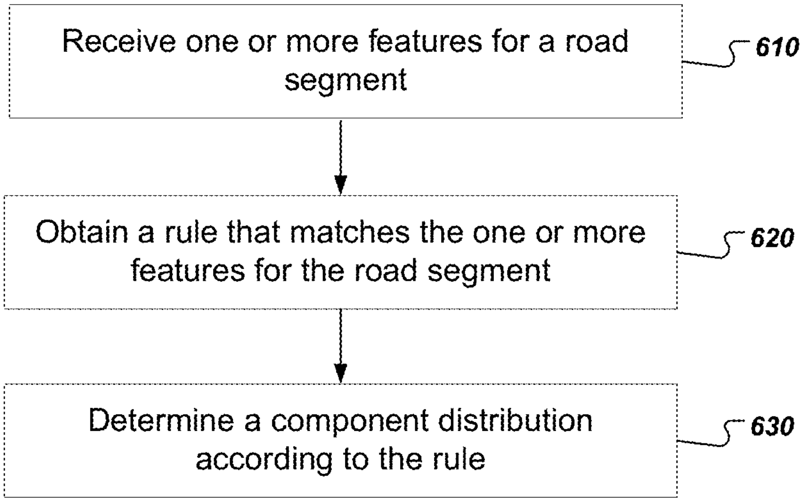
FIG. 6 illustrates an example process for classifying a new observation into a particular component distribution.

FIG. 6 illustrates an example process for classifying a new observation into a particular component distribution. In general, using the rules generated from the decision tree, the system can classify a new observation as belonging to a particular component distribution. The process will be described as being performed by a system of one or more appropriately programmed computers, e.g., the system of FIG. 1.

The system receives one or more features for a road segment (610). The one or more features may correspond to a new velocity observation or may correspond to traffic conditions at a particular time of day or under particular weather conditions.

The system obtains a rule that matches the one or more features for the road segment (620). The system can obtain one or more rules for the road segment and determine a rule that matches features for the road segment. The rule generally maps the set of one or more features to a particular component distribution.

The system determines a component distribution according to the rule (630). By obtaining a component distribution from one or more features of the road segment, a user can gain insight into traffic patterns on the particular road segment under conditions described by the one or more features.

In addition, if the one or more features correspond to a new velocity observation, the system can designate the new velocity observation as belonging to the component distribution. Thus, a user can observe where, in the component distribution, the velocity observation occurs. In other words, a user can determine that the observation corresponds to a vehicle that is traveling much slower or much faster than average, according to the component distribution.

In addition, for vehicle-independent observations, e.g., time of day or day of the week, the system can use the rules to predict traffic behavior on the entire road segment. In other words, given a particular time of day, the system can return a component distribution for that time of day that can indicate, e.g., to a user, how traffic typically flows on the road segment at that time of day.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:

receiving a velocity distribution for a road segment, wherein the velocity distribution includes a plurality of velocity intervals, and, for each velocity interval, a count of how many velocity observations have a velocity measurement within the velocity interval, wherein each velocity observation has one or more features describing conditions under which the velocity observation was made;

generating a mixture model having K component distributions, including generating a respective component distribution for each of one or more segments of the velocity distribution, wherein each velocity observation in the velocity distribution is assigned to one of the K component distributions;

generating a decision tree, wherein the decision tree has a plurality of leaves, each leaf corresponding to one of the K component distributions, wherein a path from a root of the decision tree to each leaf represents a particular set of one or more features for the road segment;

generating a rule from a particular leaf of the decision tree, wherein the rule maps one or more features for the road segment to one of the K component distributions according to a path from the root of the decision tree to the particular leaf, wherein the path corresponds to the one or more features for the road segment; and using, by a traffic data server implementing a predictive model that is configured to predict traffic behavior for a given road segment based on one or more features of the given road segment, the rule to predict traffic behavior for the road segment given one or more features for the road segment.

2. The method of claim 1, further comprising:

receiving a first velocity observation having one or more first features;

obtaining a particular rule generated from at least one leaf of the plurality of leaves of the decision tree, wherein the particular rule maps the one or more first features of the first velocity observation to a first component distribution; and designating the first velocity observation as belonging to the first component distribution based on the particular rule.

3. The method of claim 1, further comprising:

determining that a first component of the K component distributions is assigned multiple, non-consecutive segments of the velocity distribution; and assigning a first segment of the multiple, non-consecutive segments to a second component distribution of the K component distributions.

4. The method of claim 3, wherein assigning a first segment of the multiple, non-consecutive segments to a second component distribution of the K component distributions comprises:

determining that a particular segment assigned to the first component is an out-of-order segment in an ordering of the K component distributions by mean; and reassigning the out-of-order segment.

5. The method of claim 4, wherein the out-of-order segment is a beginning segment or an end segment, and wherein reassigning the out-of-order segment comprises reassigning the out-of-order segment to a component distribution of an adjacent segment.

6. The method of claim 4, wherein the out-of-order segment is between two adjacent segments assigned to respective adjacent component distributions, and wherein reassigning the out-of-order segment comprises reassigning the out-of-order segment to a particular component distribution of the adjacent component distributions having a lower mean.

7. The method of claim 1, further comprising:

computing a difference between a first mean or median of a first component distribution of the K component distributions and a second mean or median of a second component distribution of the K component distributions;

determining that the difference satisfies a threshold; and in response to determining that the difference satisfies the threshold, assigning a first segment of the velocity distribution assigned to the first component distribution and a second segment of the velocity distribution assigned to the second component distribution to a third component distribution.

8. The method of claim 1, wherein a feature of the one or more features is a time of day, a vehicle type, a road segment type, information about existing weather conditions, a number of traffic lights on the road segment, a ratio of green light time to red light time on the road segment, or a direction of travel.

9. The method of claim 1, wherein generating a mixture model having K component distributions further comprises:

calculating a Bayesian information criterion for a plurality of mixture models, wherein each mixture model has a different number of component distributions; and determining that the mixture model from the plurality of mixture models has a least negative Bayesian information criterion.

10. The method of claim 9, wherein calculating the Bayesian information criterion comprises applying a penalty factor that penalizes models having a higher number of component distributions.

11. A system comprising:

one or more computers and one or more storage devices storing instructions that are operable, when executed by the one or more computers, to cause the one or more computers to perform operations comprising:

receiving a velocity distribution for a road segment, wherein the velocity distribution includes a plurality of velocity intervals, and, for each velocity interval, a count of how many velocity observations have a velocity measurement within the velocity interval, wherein each velocity observation has one or more features describing conditions under which the velocity observation was made;

generating a mixture model having K component distributions, including generating a respective component distribution for each of one or more segments of the velocity distribution, wherein each velocity observation in the velocity distribution is assigned to one of the K component distributions;

generating a decision tree, wherein the decision tree has a plurality of leaves, each leaf corresponding to one of the K component distributions, wherein a path from a root of the decision tree to each leaf represents a particular set of one or more features for the road segment;

generating a rule from a particular leaf of the decision tree, wherein the rule maps one or more features for the road segment to one of the K component distributions according to a path from the root of the decision tree to the particular leaf, wherein the path corresponds to the one or more features for the road segment; and using, by a traffic data server implementing a predictive model that is configured to predict traffic behavior for a given road segment based on one or more features of the given road segment, the rule to predict traffic behavior for the road segment given one or more features for the road segment.

12. The system of claim 11, wherein the operations further comprise:

receiving a first velocity observation having one or more first features;

obtaining a particular rule generated from at least one leaf of the plurality of leaves of the decision tree, wherein the particular rule maps the one or more first features of the first velocity observation to a first component distribution; and designating the first velocity observation as belonging to the first component distribution based on the particular rule.

13. The system of claim 11, wherein the operations further comprise:

determining that a first component of the K component distributions is assigned multiple, non-consecutive segments of the velocity distribution; and assigning a first segment of the multiple, non-consecutive segments to a second component distribution of the K component distributions.

14. The system of claim 13, wherein assigning a first segment of the multiple, non-consecutive segments to a second component distribution of the K component distributions comprises:

determining that a particular segment assigned to the first component is an out-of-order segment in an ordering of the K component distributions by mean; and reassigning the out-of-order segment.

15. The system of claim 14, wherein the out-of-order segment is a beginning segment or an end segment, and wherein reassigning the out-of-order segment comprises reassigning the out-of-order segment to a component distribution of an adjacent segment.

16. The system of claim 14, wherein the out-of-order segment is between two adjacent segments assigned to respective adjacent component distributions, and wherein reassigning the out-of-order segment comprises reassigning the out-of-order segment to a particular component distribution of the adjacent component distributions having a lower mean.

17. The system of claim 11, wherein the operations further comprise:

computing a difference between a first mean or median of a first component distribution of the K component distributions and a second mean or median of a second component distribution of the K component distributions;

determining that the difference satisfies a threshold; and in response to determining that the difference satisfies the threshold, assigning a first segment of the velocity distribution assigned to the first component distribution and a second segment of the velocity distribution assigned to the second component distribution to a third component distribution.

18. The system of claim 11, wherein a feature of the one or more features is a time of day, a vehicle type, a road segment type, information about existing weather conditions, a number of traffic lights on the road segment, a ratio of green light time to red light time on the road segment, or a direction of travel.

19. The system of claim 11, wherein generating a mixture model having K component distributions further comprises:

calculating a Bayesian information criterion for a plurality of mixture models, wherein each mixture model has a different number of component distributions; and determining that the mixture model from the plurality of mixture models has a least negative Bayesian information criterion.

20. The system of claim 19, wherein calculating the Bayesian information criterion comprises applying a penalty factor that penalizes models having a higher number of component distributions.

21. A computer program product, encoded on one or more non-transitory computer storage media, comprising instructions that when executed by one or more computers cause the one or more computers to perform operations comprising:

receiving a velocity distribution for a road segment, wherein the velocity distribution includes a plurality of velocity intervals, and, for each velocity interval, a count of how many velocity observations have a velocity measurement within the velocity interval, wherein each velocity observation has one or more features describing conditions under which the velocity observation was made;

generating a mixture model having K component distributions, including generating a respective component distribution for each of one or more segments of the velocity distribution, wherein each velocity observation in the velocity distribution is assigned to one of the K component distributions;

generating a decision tree, wherein the decision tree has a plurality of leaves, each leaf corresponding to one of the K component distributions, wherein a path from a root of the decision tree to each leaf represents a particular set of one or more features for the road segment;

generating a rule from a particular leaf of the decision tree, wherein the rule maps one or more features for the road segment to one of the K component distributions according to a path from the root of the decision tree to the particular leaf, wherein the path corresponds to the one or more features for the road segment; and using, by a traffic data server implementing a predictive model that is configured to predict traffic behavior for a given road segment based on one or more features of the given road segment, the rule to predict traffic behavior for the road segment given one or more features for the road segment.

* * * * *